(12) United States Patent
Karato et al.

(10) Patent No.: US 6,984,706 B2
(45) Date of Patent: Jan. 10, 2006

(54) DIENE RUBBER, PROCESS FOR PRODUCTION THEREOF, RUBBER COMPOSITIONS, PROCESS FOR PRODUCING THE SAME, AND CROSSLINKED RUBBERS

(75) Inventors: Takeshi Karato, Tokyo (JP); Masaaki Komatu, Tokyo (JP); Kazuhiro Takase, Kanagawa (JP)

(73) Assignee: Zeon Corporation, Tokyo (JP)

( * ) Notice: Subject to any disclaimer, the term of this patent is extended or adjusted under 35 U.S.C. 154(b) by 0 days.

(21) Appl. No.: 10/507,835

(22) PCT Filed: Mar. 14, 2003

(86) PCT No.: PCT/JP03/03097

§ 371 (c)(1),
(2), (4) Date: Mar. 24, 2005

(87) PCT Pub. No.: WO03/078482

PCT Pub. Date: Sep. 25, 2003

(65) Prior Publication Data

US 2005/0154156 A1   Jul. 14, 2005

(30) Foreign Application Priority Data

Mar. 15, 2002  (JP) .............................. 2002-073037

(51) Int. Cl.
*C08F 36/04* (2006.01)
*C08F 2/42* (2006.01)

(52) U.S. Cl. .......................... 526/335; 526/82; 526/83; 526/84; 526/85; 526/340; 525/236; 525/237; 525/332.5; 525/332.9; 525/333.2; 524/570; 524/575; 528/500

(58) Field of Classification Search .................. 526/82, 526/83, 84, 85, 335, 340; 525/236, 332.5, 525/332.9, 333.2, 570, 575; 528/500

See application file for complete search history.

(56) References Cited

U.S. PATENT DOCUMENTS 5,548,043 A  *  8/1996  Saban et al. ................... 526/84
6,191,226 B1 *  2/2001  Matsuda et al. ............ 525/236

FOREIGN PATENT DOCUMENTS

| EP | 282437 A2 | 9/1988 |
|----|-----------|--------|
| EP | 1236747 A | 9/2002 |
| JP | 06 200075 A | 7/1994 |
| JP | 10-158338 A | 6/1998 |
| JP | 11-92509 A | 4/1999 |
| WO | WO 01/10919 A1 | 2/2001 |

* cited by examiner

*Primary Examiner*—Fred Teskin
(74) *Attorney, Agent, or Firm*—Birch, Stewart, Kolasch & Birch, LLP

(57) ABSTRACT

A diene rubber (A) having a weight average molecular weight (Mw) of 100,000 to 3,000,000, an Mw/number average molecular weight (Mn) ratio of 1.30 to 2.50, and an Mw/peak top molecular weight (Mp) ratio 0.70 to 1.30. A rubber composition comprising the diene rubber (A) and a diene rubber (B) having an Mw of 2,000 to 90,0000 and/or an oil extender for rubber has good processability and can give a rubber vulcanizate having high tensile strength and good abrasion resistance. The diene rubber (A) is produced by conducting a living polymerization of diene monomer in a hydrocarbon solvent; adding a polymerization stopper to a polymerization mixture at a conversion of 5 to 98% to deactivate 10 to 90% by mole of active terminals present as of the initiation of polymerization; and finally adding a polymerization stopper to completely terminate the polymerization reaction.

23 Claims, No Drawings

DIENE RUBBER, PROCESS FOR PRODUCTION THEREOF, RUBBER COMPOSITIONS, PROCESS FOR PRODUCING THE SAME, AND CROSSLINKED RUBBERS

TECHNICAL FIELD

This invention relates to a diene rubber having good processability and giving a rubber vulcanizate having high tensile strength and good abrasion resistance; and a rubber composition comprising the diene rubber.

The invention further relates to a process for producing the above-mentioned diene rubber, and a process for producing the above-mentioned rubber composition.

BACKGROUND ART

Rubber having high tensile strength and good abrasion resistance are required for a high-performance tire. A high-molecular-weight rubber having incorporated therein a large amount of a reinforcing agent is used for such rubber. However, a high-molecular-weight rubber has a high Mooney viscosity and poor processability, and therefore, a reinforcing agent is difficult to uniformly disperse therein by kneading. For kneading the rubber with a large amount of a reinforcing agent, a high power and a substantially long time are required. Thus, compatibility of good processability with high tensile strength and good abrasion resistance is eagerly desired.

In Japanese Examined Patent Publication (hereinafter abbreviated to as "JP-B") No. H5-74614, a rubber composition having high tensile strength and good abrasion resistance is described, which comprises a low-molecular-weight aromatic vinyl-diene copolymer, obtained by polymerization carried out using an organolithium compound in a hydrocarbon solvent, and a styrene-butadiene copolymer rubber. In Japanese Unexamined Patent Publication (hereinafter abbreviated to as "JP-A") No. H6-65418, a rubber composition having high tensile strength and good abrasion resistance is described, which comprises a modified low-molecular-weight aromatic vinyl-diene copolymer which has been obtained by anion living polymerization and further modification with an N-substituted amino compound, and a styrene-butadiene copolymer rubber.

In JP-A H6-200075, a rubber composition having reduced heat-build up and good abrasion resistance is described, which comprises natural rubber and/or polyisoprene rubber, a specific carbon black, and liquid polybutadiene, liquid polyisoprene or liquid styrene-butadiene copolymer rubber.

The above-described rubber compositions are still insufficient in compatibility of good processability with high tensile strength and good abrasion resistance.

In JP-A H6-278410, a tire having a cap tread comprised of a rubber composition comprising a raw material rubber having incorporated therewith a low-molecular-weight diene polymer is described. This tire is said as exhibiting a reduced change of tire tread with time and having good abrasion resistance. However, its abrasion resistance is still insufficient.

In JP-B H6-86500, a process for producing a conjugated diolefin polymer is described, which has an average vinyl bond content of at least 50% by weight in the conjugated diolefin unit portion, contains 5% to 30% by weight of a fraction having a molecular weight of smaller than 100,000 and having a vinyl bond content of smaller than 50% by weight, has a Mooney viscosity ($ML_{1+4}$,100° C.) in the range of 30 to 100, and contains at least 30% by weight of branched polymers. This conjugated diene polymer is produced by the steps of polymerizing a conjugated diolefin and an aromatic vinyl compound using an organolithium initiator in the presence of a Lewis base in a hydrocarbon solvent; adding a deactivator for deactivating the active terminals of polymer chains after the completion of polymerization; and further additional amounts of the conjugated diolefin and the aromatic vinyl compounds, the hydrocarbon solvent and the Lewis base were added to conduct polymerization. This production process has problems such that the polymerization is very difficult to carry out under thoroughly controlled conditions, and the production efficiency is low. Further, although the conjugated diolefin polymer is said as having high tensile strength and good abrasion resistance, the tensile strength and the abrasion resistance have not been enhanced to the sufficient extent.

DISCLOSURE OF THE INVENTION

An object of the present invention is to provide a diene rubber having good processability and capable of giving a rubber vulcanizate having high tensile strength and good abrasion resistance; and further provide a rubber composition comprising the diene rubber.

Another object of the present invention is to provide production processes by which the above-mentioned diene rubber and a rubber composition comprising the diene rubber can be industrially beneficially produced.

A further object is to provide a diene rubber vulcanizate having high tensile strength and good abrasion resistance.

To solve the foregoing problems of the prior art, the inventors made extensive researches and found that a diene rubber having a specific molecular weight distribution gives a rubber vulcanizate having high tensile strength and good abrasion resistance although the diene rubber exhibits good processability. The present invention has been completed based on this finding.

Thus, in accordance with the present invention, there are provided a diene rubber (A), a process for producing the diene rubber (A), a rubber composition comprising the diene rubber (A), a process for producing the rubber composition, and a rubber vulcanizate made from the rubber composition, which are recited below.

(1) A diene rubber (A) comprised of a homopolymer or copolymer of a conjugated diene monomer, which has a weight average molecular weight (Mw) in the range of 100,000 to 3,000,000, a ratio (Mw/Mn) of weight average molecular weight (Mw) to number average molecular weight (Mn) in the range of 1.30 to 2.50, and a ratio (Mw/Mp) of weight average molecular weight (Mw) to peak top molecular weight (Mp) in the range of 0.70 to 1.30, wherein the molecular weights are measured by gel permeation chromatography (GPC) and expressed in terms of that of polystyrene.

(2) A process for producing the above-mentioned diene rubber (A), characterized in that:

a conjugated diene monomer alone or at least two kinds of conjugated diene monomers, or a conjugated diene monomer or monomers together with other copolymerizable monomer or monomers, are subjected to a living polymerization in a hydrocarbon solvent;

a polymerization stopper is added to a polymerization mixture at a polymerization conversion in the range of 5% to 98% to deactivate 10% to 90% by mole of the active terminals present as of the initiation of polymerization; and then, a polymerization stopper is further added after the polymerization conversion substantially reaches 100%, to completely terminate the polymerization reaction.

(3) A rubber composition comprising the above-mentioned diene rubber (A), and 10 to 200 parts by weight, based on 100 parts by weight of the diene rubber (A), of a reinforcing agent.

(4) A rubber composition comprising;

the above-mentioned diene rubber (A), and at least one kind of material selected from (i) a diene rubber (B) comprised of a homopolymer or copolymer of a conjugated diene monomer, which has a weight average molecular weight (Mw) in the range of 2,000 to 90,000 as expressed in terms of that of polystyrene, and (ii) an oil extender for rubber;

wherein the amount of the material selected from the diene rubber (B) and the oil extender is in the range of 5 to 200 parts by weight based on 100 parts by weight of the diene rubber (A), provided that, in the case when the rubber composition comprises both of the diene rubber (B) and the oil extender, the amount of each of the diene rubber (B) and the oil extender is at least 5 parts by weight and the sum of the diene rubber (B) and the oil extender is not larger than 200 parts by weight, (5) A rubber composition as described above in (4) comprising the above-mentioned diene rubber (A), and at least one kind of material selected from (i) the above-mentioned diene rubber (B) and (ii) an oil extender for rubber, and further comprising not larger than 500 parts by weight, based on 100 parts by weight of the diene rubber (A), of a diene units-containing rubber (C) other than the diene rubber (A) and the diene rubber (B).

(6) A rubber composition as described above in (4) or (5), which further comprises a reinforcing agent in an amount of 10 to 200 parts by weight based on 100 parts by weight of the total of the diene rubbers (A) and (B) and, if any, the diene units-containing rubber (C).

(7) A process for producing the rubber composition as described above in (4), characterized as comprising the steps of:

mixing a rubber solution as obtained by termination of polymerization reaction, which contains the above-mentioned diene rubber (A), with stirring in a solution form together with at least one kind of material selected from (1) a rubber solution as obtained by termination of polymerization reaction, which contains the above-mentioned diene rubber (B) having a weight average molecular weight (Mw) in the range of 2,000 to 90,000 as expressed in terms of that of polystyrene, and (ii) an oil extender for rubber; and then, subjecting the thus-obtained mixed solution to steam stripping to remove a solvent.

(8) A rubber vulcanizate obtained by crosslinking a vulcanizable rubber composition comprising the rubber composition as described above in any one of (3) to (6), and a crosslinking agent.

BEST MODE FOR CARRYING OUT THE INVENTION

Diene Rubber (A)

The diene rubber (A) of the present invention a homopolymer of a conjugated diene monomer, or a copolymer of at least two conjugated diene monomers or a copolymer of a conjugated diene monomer with other copolymerizable monomer or monomers.

As specific examples of the conjugated diene monomer, there can be mentioned 1,3-butadiene, 2-methyl-1,3-butadiene, 2,3-dimethyl-1,3-butadiene, 2-chloro-1,3-butadiene and 1,3-pentadiene. Of these, 1,3-butadiene and 2-methyl-1,3-butadiene are preferable. 1,3-Butadiene is especially preferable. These conjugated diene monomers may be used either alone or as a combination of at least two thereof.

The amount of the conjugated diene monomer is at least 40% by weight, preferably in the range of 50% to 95% by weight and more preferably 60% to 90% by weight, based on the total weight of the monomers used for the diene rubber.

The monomer copolymerizable with the conjugated diene monomer is not particularly limited, and includes, for example, amino group-containing vinyl monomers and aromatic vinyl monomers. Of these, aromatic vinyl monomers are preferable. As specific examples of the aromatic vinyl monomers, there can be mentioned styrene, α-methylstyrene, 2-methylstyrene, 3-methylstyrene, 4-methylstyrene, 2,4-diisopropylstyrene, 2,4-dimethylstyrene, 4-t-butylstyrene, 5-t-butyl-2-methylstyrene, N,N-dimethylaminoethyl-styrene and N,N-diethylaminoethyl-styrene. Of these, styrene is especially preferable. These copolymerizable monomers may be used either alone or as a combination of at least two thereof.

The relative amount of the copolymerizable monomer in the copolymer is not larger-than 60% by weight, preferably in the range of 5% to 50% by weight and more preferably 10% to 40% by weight, based on the total weight of the monomers used for the diene rubber.

The content of vinyl bond (that is, the sum of 1,2-vinyl bond content and 3,4-vinyl bond content) in the conjugated diene monomer constituting the diene rubber (A) is usually at least 5% by mole, preferably in the range of 20% to 80% by mole and more preferably 30% to 70% by mole.

The diene rubber (A) of the present invention has a weight average molecular weight (Mw) in the range of 100,000 to 3,000,000, preferably 300,000 to 2,000,000 and more preferably 600,000 to 1,500,000 as measured by gel permeation chromatography and as expressed in terms of that of polystyrene. When Mw is too small, the tensile strength and abrasion resistance of a rubber vulcanizate are poor. In contrast, when Mw is too large, the kneadability and processability are poor, leading to reduction of the dispersion of a reinforcing agent and consequently reduction of the tensile strength and abrasion resistance of a rubber vulcanizate.

The diene rubber (A) of the present invention is characterized as having a specific molecular weight distribution. That is, the ratio of weight average molecular weight (hereinafter abbreviated to as "Mw" when appropriate) to number average molecular weight (hereinafter abbreviated to as "Mn" when appropriate) is in the range of 1.30 to 2.50, and the ratio of Mw to peak top molecular weight (hereinafter abbreviated to as "Mp" when appropriate) is in the range of 0.70 to 1.30. The molecular weights are measured by GPC. At the measurement according to GPC, in the case when a plurality of molecular weight peaks are observed, by the Mp as used herein, we mean a molecular weight at the highest peak.

The ratio of Mw to Mn (i.e., Mw/Mn) is preferably in the range of 1.45 to 2.40, more preferably 1.60 to 2.30. If Mw/Mn is too small, the kneadability and processability of rubber composition are poor and the abrasion resistance of a rubber vulcaniate is poor. In contrast, if Mw/Mn is too large, both of the tensile strength and abrasion resistance of a rubber vulcanizate are poor.

The ratio of Mw to Mp (i.e., Mw/Mp) is preferably in the range of 0.75 to 1.20, more preferably 0.80 to 1.10. If Mw/Mp is too small, the tensile strength of a rubber vulcanizate is low. In contrast, If Mw/Mp is too large, both of the tensile strength and the abrasion resistance of a rubber vulcaniate are poor.

The diene rubber (A) of the present invention is produced by the following process.

Usually, a conjugated diene monomer alone or at least two kinds of conjugated diene monomers, or a conjugated diene monomer or monomers together with other copolymerizable monomer or monomers, is subjected to a living polymerization using an active organometal as a polymerization initiator in the presence of a polar compound in a hydrocarbon solvent.

As specific examples of the hydrocarbon solvent used in the living polymerization, there can be mentioned aliphatic hydrocarbons such as n-butane, n-pentane, isopentane, n-hexane, n-heptane and isooctane; alicyclic hydrocarbons such as cyclopentane, cyclohexane and methylcyclopentane; and aromatic hydrocarbons such as benzene and toluene. The amount of hydrocarbon solvent is not particularly limited, but is preferably such that the concentration of the monomers is in the range of 1% to 50% by weight.

As the active organometal, organic alkali metals are preferably used. The organic alkali metal includes, for example, an organolithium compound, an organosodium compound and an organopotassium compound. Nitrogen atom-containing organic alkali metals such as addition products of these organic alkali metals with an amino group-containing monomer, and organic alkali metal amides may also be used as a polymerization initiator. Of these organic alkali metals, organolithium compounds such as an organo-monolithium compound and polyfunctional organolithium compound are preferable. An organo-monolithium compound is especially preferable. The amount of active organometal is appropriately chosen depending upon the molecular weight of the polymer required, but is preferably in the range of 0.1 to 30 milli-mole per 100 g of the monomer.

As the polar compound, there can be mentioned ether compounds, tertiary amines, alkali alkoxides and phosphine compounds. Of these, ether compounds and tertiary amines are preferable. The amount of polar compound is preferably in the range of 0.01 to 100 moles, more preferably 0.2 to 50 moles and especially preferably 0.4 to 30 moles, per mole of the active organometal used as a polymerization initiator. When the amount of polar compound is too small, the relative amount of vinyl bond in the conjugated diene units cannot be enhanced to a desired extent. Also when the amount of polar compound is too large, the relative amount of vinyl bond in the conjugated diene units is difficult to enhance.

In the process for producing the diene rubber (A) of the present invention, the time of addition of a polymerization stopper and the amount thereof are important. That is, a polymerization stopper is added to a polymerization mixture at a polymerization conversion in the range of 5% to 98% to deactivate 10% to 90% by mole of the active terminals present as of the initiation of polymerization (this addition is hereinafter referred to as "middle addition" when appropriate); and then, a polymerization stopper is further added after the polymerization conversion substantially reaches 100%, to completely terminate the polymerization reaction (this addition is hereinafter referred to as "final addition" when appropriate).

The middle addition of a polymerization stopper is carried out at a time when the polymerization conversion is in the range of 5% to 98%, preferably 10t to 95% and more preferably 15% to 90%. If a polymerization stopper is added before or after the polymerization conversion falls within this range, the control of polymerization becomes difficult. The amount of a polymerization stopper added at the time of middle addition is such that 10% to 90% by mole, preferably 13% to 70% by mole and more preferably 15% to 50% by mole of the active terminals present as of the initiation of polymerization are deactivated. If the amount of a polymerization stopper added at the time of middle addition is too small, a resulting diene rubber has poor kneadability and processability. In contrast, if the amount of a polymerization stopper is too large, the control of polymerization becomes difficult and a substantially long time is required for the completion of polymerization.

The addition of a polymerization stopper at a polymerization conversion of 5 to 98% can be carried out continuously or intermittently. Continuous addition is preferable.

The polymerization is preferably carried out at a temperature in the range of −78 to 150° C. in a batchwise or continuous manner. In the case when a polymerization stopper is continuously added while the polymerization is carried out in a continuous manner, it is preferable to adopt two separate polymerization vessels, one of which contains a polymerization mixture having a polymerization conversion of 5% to 98% for the continuous middle addition of a polymerization stopper, and the other of which contains a polymerization mixture having a polymerization conversion of substantially 100% for the final addition of a polymerization stopper. In the case when a polymerization stopper is intermittently added while the polymerization is carried out in a continuous manner, it is preferable to adopt a plurality of polymerization vessels so that the polymerization stopper is separately added to the vessels. In the case of batchwise polymerization, the final addition of a polymerization stopper at a conversion of substantially at least 100% can be carried out either in the same polymerization vessel or in a separate polymerization vessel.

The reaction temperature and reaction time for the polymerization stop reaction can be chosen from a broad range, but are preferably in the ranges of 15 to 120° C. and 1 second to 10 hours, respectively.

The polymerization stopper used for the middle addition at a polymerization conversion of 5% to 98% and the final addition at a polymerization conversion of substantially 100% can be chosen from those which are conventionally used for the polymerization of diene monomers, which include, for example, water; alcohols such as methanol and ethanol; allenes such as 1,2-butadiene; and acetylenes such as 1-butyne and 1-butene. The polymerization stopper further includes those which are capable of introducing a polar group to a terminal of polymer chain. Such polymerization stoppers are preferably compounds having a functional group containing at least one atom selected from, for example, a tin atom, a nitrogen atom, an oxygen atom and a sulfur atom. The polymerization stoppers include not only those which are capable of deactivating the active terminal of polymer chain to completely stop the polymerization, but also those which do not deactivate the active terminal of polymer chain and, when the above-mentioned copolymerizable monomers are copolymerized, the copolymerization proceeds at an extremely low rate.

As specific examples of the polymerization stopper containing a tin atom, there can be mentioned trimethylmonochlorotin and triphenylmonochorotin.

As specific examples of the polymerization stopper containing a nitrogen atom, there can be mentioned N,N-disubstituted aminoalkylacrylamide compounds and N,N-disubstituted aminoalkylmethacrylamide compounds, such as N,N-dimethylaminopropylacrylamide and N,N-dimethylaminopropylmethacrylamide; pyridyl group-containing vinyl compounds such as 4-vinylpyridine; N-substituted cyclic amides such as N-methyl-2-pyrrolidone, N-vinyl-2-pyrrolidone, N-phenyl-2-pyrrolidone and N-methyl-ε-caprolactam; N-substituted cyclic ureas such as 1,3-dimethylethylene urea and 1,3-diethyl-2-imidazolidinone; N-substituted aminoketones such as 4,4'-bis(dimethylamino)benzophenone and 4,4'-bis(diethylamino)benzophenone; N-substituted aminoaldehydes such as 4-N,N-dimethylaminobenzaldehyde; N-substituted carbodiimides such as dicyclohexylcarbodiimide; Schiff bases such as N-ethylethylideneimine and N-methylbenzylideneimine; and aromatic isocyanates such as 2,4-tolylene diisocyanate, and their polymers. Of these, N,N-disubstituted aminoalkylacrylamide compounds, N-substituted cyclic amides, N-substituted cyclic ureas and N-substituted aminoketones are preferable. More specifically N,N-dimethylaminopropylacrylamide, N-methyl-ε-caprolactam, 1,3-diethyl-2-imidazolidinone and 4,4'-bis(diethylamino)-benzophenone are especially preferable.

As specific examples of the polymerization stopper containing an oxygen atom, there can be mentioned triphenoxychlorosilane and methyltriphenoxysilane.

As specific examples of the polymerization stopper containing a sulfur atom, there can be mentioned bis(triethoxysilylpropyl)tetrasulfide and bis(tributoxysilylpropyl)tetrasulfide.

The diene rubber (A) may be a terminal-modified diene rubber having a polar group at a terminal of polymer chain. The terminal-modified diene rubber can be produced by a method wherein the polymerization reaction is stopped with a polymerization stopper having the above-mentioned functional group for the production of the diene rubber (A).

The terminal-modified diene rubber can also be produced by a method wherein, after the polymerization conversion reaches substantially 100% but prior to the final addition of a polymerization stopper, a monomer having a polar group is added to react with the active polymer having an active organometal bonded to a terminal of polymer chain. The monomer having a functional group preferably includes, for example, N,N-disubstituted aminoaromatic vinyl compounds such as N,N-dimethylaminoethylstyrene and N,N-diethylaminoethyl-styrene.

Further, the terminal-modified diene rubber can also be produced by a method wherein the above-mentioned organoalkali metal containing a nitrogen atom is used as a polymerization initiator to introduce a polar group to a terminal for polymerization initiation.

The polar group at a terminal of polymer chain may be substituted with another polar group. For example, in the case when a tertiary amino group has been introduced to a terminal of polymer chain, the polymer may be treated with a quaternarizing agent to convert the tertiary amino group to a quaternary amino group. The quarternarizing agent used includes, for example, an alkyl nitrate, a potassium alkylsulfate, a dialkylsulfuric acid, an arylsulfonic acid alkyl ester, an alkyl halide and a metal halide.

The percentage of modification, i.e., the ratio of the modified polymer having a polar group at a terminal of polymer chain to the total polymers is in the range of 10% to 100% by mole, based on the active terminals present as of the initiation of polymerization. The percentage of modification can be determined by calculating a ratio (UV/RI) of an absorption intensity (UV) as measured by an ultraviolet-visible light spectrophotometer to a differential refractive index (RI) as measured by a differential refractometer according to GPC, and calibrating according to a previously prepared calibration curve.

With a larger percentage of modification as obtained by terminal modification, a resulting rubber vulcanizate generally has better wet grip characteristic and more reduced heat-build up.

The diene rubber (A) may be a coupled diene rubber, which is obtained by reacting an active polymer having a polymer chain terminal to which an active organometal has been bonded, with a coupling agent, prior to the above-mentioned final addition of a polymerization stopper. By allowing the terminal of polymer chain having bonded thereto an active organometal to react with a coupling agent prior to the step of stopping the polymerization reaction, a coupled polymer comprised of a plurality of polymer molecules is obtained which has a structure such that the polymer chains of the polymer molecules are bonded together at the site of each polymer chain terminal having an active organometal via the coupling agent.

The coupling agent used is not particularly limited provided that it is capable of forming a coupled diene rubber. As specific examples of the coupling agent, there can be mentioned tin-containing coupling agents such as tin tetrachloride; silicon-containing coupling agents such as silicon tetrachloride, tetramethoxysilane, diphenoxydichlorosilane and modified silicone; unsaturated nitrile coupling agents; ester coupling agents: halide coupling agents; phosphorus-containing coupling agents; epoxy coupling agents such as tetraglycidyl-1,3-bisaminomethylcyclohexane, epoxidized linseed oil and epoxidized polybutadiene: and isocyanate coupling agents. These coupling agents may be used either alone or as a combination of at least two thereof.

The amount of coupling agent is can be appropriately chosen depending upon the required weight average molecular weight and percentage of coupling, and the reactivity of coupling agent, but is preferably in the range of 0.1 to 10 equivalent based on the active organometal. The coupling reaction is carried out preferably at a temperature of 0 to $150°$ C. for 0.5 to 20 hours. The percentage of coupling can be appropriately chosen but is preferably in the range of 10% to 100% based on the polymer chains having an active organometal-bonded terminal. The percentage of coupling can be determined from peak areas as measured by differential refractometer according to GPC before and after coupling. That is, the percentage of coupling is calculated from a ratio of (B)/(A) wherein (A) is an area of a peak as observed after coupling at the same position as the peak as observed before coupling, and (B) is an area of the region corresponding to higher molecular weights.

To a polymerization liquid as obtained after the step of stopping the polymerization, auxiliary ingredients may be added according to the need. In the case when the polymerization liquid is heated in the succeeding step for removal of solvent and for drying, an antioxidant is preferably added to the as-obtained polymerization liquid, which includes, for example, a phenolic antioxidant, a phosphorus-containing antioxidant and a sulfur-containing antioxidant. The amount of antioxidant can be appropriately determined depending upon the kind of antioxidant and other factors.

The method of recovering a diene rubber is not particularly limited. For example, there can be adopted a direct drying method wherein a polymerization liquid is directly dried by, for example, heating whereby a solvent is removed; a method wherein a polymerization liquid is poured into a solvent incapable of dissolving a diene rubber to precipitate the diene rubber, and the precipitate is collected by filtration or other means and then dried to remove a solvent; and a method wherein high-temperature steam is blown into a polymerization liquid whereby a solvent is removed and a diene rubber is precipitated in a crumb state in water formed from steam, and then, the precipitate is collected by filtration or other means and then dried to remove moisture. In the case when impurities such as metal residue cannot be thoroughly removed by these methods, a procedure of dissolving the rubber in good solvent for diene rubber and then precipitating the rubber in a poor solvent for diene rubber can be repeatedly carried out, and then, the precipitate is washed and dried.

In a preferable recovering method, a polymerization liquid is subjected to steam stripping to remove a solvent and form an aqueous slurry in which the diene rubber is dispersed in a crumb state therein, and then the slurry is dried. The procedures for steam stripping are not particularly limited and can appropriately chosen from conventional procedures.

In the case when steam stripping is carried out, it is preferable that a dispersant or a coagulating aid is added to a polymerization liquid prior to steam stripping, or water having added therein a dispersant or a coagulating liquid is blown together with high-temperature steam into a polymerization liquid at the steam stripping.

The dispersant used includes surface active agents such as a nonion surfactant, an anion surfactant and a cation surfactant. Of these, a nonion surfactant such as an ethylene oxide-propylene oxide block copolymer.

These dispersants are added preferably in an amount such that an aqueous solution having a concentration of 0.1 to 3,000 ppm is obtained. A water-soluble salt of a metal selected from lithium, sodium, potassium, magnesium, calcium, aluminum or tin can be used as a coagulation aid in combination with the dispersant.

The lower limit in concentration of diene rubber crumb dispersed in water is preferably 0.1 by weight, more preferably 0.5% by weight and especially preferably 1% by weight, and the upper limit in concentration thereof is preferably not larger than 20% by weight, more not larger than 15% by weight and especially preferably 10% by weight, based on the weight of water used for steam stripping. At this rubber crumb concentration, a diene rubber in the form of crumb having a desired particle diameter can be obtained without any trouble for handling.

The moisture-containing diene rubber crumb is preferably dehydrated to a moisture content in the range of 1 to 30% byweight. For the dehydration, a compressional dehydrator such as a roll, a Banbury dehydrator and a screw-type extruder can be used.

After dehydration, the residual moisture is removed by drying to give a dried diene rubber. The drying is carried out using dryers such as a screw-type extruder, a kneader-type dryer, an expander dryer and a hot-air dryer.

Rubber Composition Comprising Diene Rubber (A)

The diene rubber (A) of the present invention can be used as a rubber composition, which comprises the diene rubber (A) having incorporated therein a reinforcing agent.

The diene rubber (A) of the present invention can also be used as a rubber composition, which comprises the diene rubber (A) having incorporated therein a diene rubber (B) having a weight average molecular weight in the range of 2,000 to 90,000 as expressed in terms of that of polystyrene, and/or an oil extender for rubber, or a rubber composition, which comprises the diene rubber (A) having incorporated therein the diene rubber (B) and/or an oil extender, and further a reinforcing agent.

The diene rubber (B) has a weight average molecular weight (Mw) in the range of 2,000 to 90,000, preferably 5,000 to 70,000 and more preferably 10,000 to 50,000 as expressed in terms of that of polystyrene. If Mw of the diene rubber (B) is too low, a rubber vulcanizate has poor abrasion resistance. In contrast, if Mw of the diene rubber (B) is too high, the intended effect of the low molecular weight diene rubber (B) as a softening agent, such as reduction of viscosity of an unvulcanized rubber composition, and reduction of hardness of a rubber vulcanizate, cannot be obtained A ratio (Y/X) of 1,4-bond content (Y) in the diene rubber (B) to 1,4-bond content (X) in the diene rubber (A) is not particularly limited, but Y/X is preferably in the range of 0.2 to 1.4, more preferably 0.4 to 1.1 and especially preferably 0.6 to 1. A rubber composition with a too large Y/X ratio tends to give a rubber vulcanizate having low mechanical strength and poor abrasion resistance. In contrast, a rubber composition with a too small Y/X ratio is difficult to prepare.

By the term "1,4-bond content" as used herein, we mean a ratio by mole of the amount of 1,4-bonded conjugated diene monomer units to the amount of the conjugated diene monomer units in the diene rubber.

The diene rubber (B) includes a homopolymer of a conjugated diene monomer, or a copolymer of at least two conjugated diene monomers or a copolymer of a conjugated diene monomer with other copolymerizable monomer or monomers, as similar to the case of the diene rubber (A). The diene rubber (B) may be a terminal-modified diene rubber, which can be produced by the same method as mentioned above for the production of the diene rubber (A).

The process for the production of the diene rubber (B) is not particularly limited, provided that a diene rubber having the above-mentioned relatively low molecular weight can be produced. The same process as mentioned above for the production of the diene rubber (A) can be adopted.

The amount of diene rubber (B) is in the range of 5 to 200 parts by weight, preferably 10 to 100 parts by weight and more preferably 30 to 60 parts by weight based on 100 parts by weight of the diene rubber (A). When the amount of diene rubber (B) is too small, the intended effect of the low molecular weight diene rubber (B) as a softening agent cannot be obtained. In contrast, when the amount of diene rubber (B) is too large, a rubber is difficult to produce. The diene rubber (B) may be used either alone or as a combination of at least two thereof.

As the oil extender for rubber, mineral oils and synthetic oils, which are generally used for diene rubbers, can be used. The mineral oils include, for example, aromatic oil, naphthenic oil and paraffinic oil.

The oil extender preferably has an aromatic carbon content (CA%) of at least 5%, more preferably at least 15%, as measured according to ASTM D3238. The oil extender preferably has a paraffinic carbon content (CP%) of not larger than 70%, more preferably not larger than 60% and especially preferably not larger than 50%. When the CA% is too small or CP% is too large, a rubber vulcanizate is liable to have low tensile strength and poor abrasion resistance. The polycyclic aromatic carbon content of the oil extender is preferably smaller than 3% as measured by the method of IP 346.

The amount of oil extender for rubber is in the range of 5 to 200 parts by weight, preferably 10 to 100 parts by weight and more preferably 30 to 60 parts by weight based on 100 parts by weight of the diene rubber (A). When the amount of oil extender is too small, the intended effect as a softening agent cannot be manifested at kneading. In contrast, when the amount of oil extender is too large, a rubber is difficult to produce. The oil extender for rubber may be used either alone or as a combination of at least two thereof.

In the case when both of the diene rubber (B) and an oil extender for rubber are incorporated, the amount of each of the diene rubber (B) and an oil extender is preferably at least 5 parts by weight and the sum of the diene rubber (B) and an oil extender is preferably not larger than 200 parts by weight, based on 100 parts by weight of the diene rubber (A).

In the production of a rubber composition by mixing the diene rubber (A) with the diene rubber (B) and/or an oil extender, the diene rubber (B) and the oil extender can be mixed in a solid or liquid state.

The mixing in a solid state can be effected by a procedure wherein a polymer obtained by separating from a polymerization liquid and drying the separated polymer, is mixed using a mixer such as a Banbury mixer, a roll mill or a screw extruder.

The mixing in a liquid state can be effected by a procedure wherein one of the diene rubber (A) and the diene rubber (B) in a solid form is incorporated in a polymerization liquid as obtained by adding a polymerization stopper in the process for producing the other of the two rubbers, or a procedure wherein a polymerization liquid as obtained by adding a polymerization stopper in the process for producing the diene rubber (A) is incorporated with a polymerization liquid as obtained by adding a polymerization stopper in the process for producing the diene rubber (B). The latter procedure for mixing the two polymerization liquids as obtained by the addition of polymerization stopper is preferable.

For incorporating an oil extender for rubber, there can be adopted a procedure wherein the oil extender is incorporated in a polymerization liquid as obtained by adding a polymerization stopper in the process for producing the diene rubber (A), or a procedure wherein the oil extender is incorporated in a mixture of two polymerization liquids as obtained by adding a polymerization stopper in the processes for producing the diene rubber (A) and the diene rubber (B). In these procedures, the mixing is carried in a liquid state.

The mixing in a liquid state of a polymerization liquid as obtained by adding a polymerization stopper in the process for producing the diene rubber (A), with a polymerization liquid as obtained by adding a polymerization stopper in the process for producing the diene rubber (A), and/or an oil extender for rubber can be carried out by feeding predetermined amounts of the respective ingredients into a vessel where the ingredients are mixed together preferably using a stirrer. The concentration of polymer in the mixed polymer liquid is not particularly limited, but, to obtain good cohesiveness at steam stripping, the polymer concentration is usually in the range of 5 to 70% by weight, preferably 10 to 50% by weight and more preferably 10 to 30% by weight.

In the case when a mixed liquid of a diene rubber (A)-containing liquid and a diene rubber (B)-containing liquid and/or an oil extender for rubber is subjected to steam stripping, a dispersant is preferably added prior to the steam stripping, for example, at the step of adding the oil extender. The addition of a dispersant is especially effective for a mixed liquid containing a tacky diene rubber (B)-containing liquid, to prevent undesirable sticking of polymer crumbs obtained by coagulation of the mixed liquid, and enhancing the handling characteristics.

Diene units-containing rubber (c) other than the diene rubber (A) and the diene rubber (B) may be incorporated in the rubber composition of the present invention, provided that the rubber composition has good processability and gives a rubber vulcanizate having high tensile strength and good abrasion resistance.

As specific examples of the diene units-containing rubber (C), there can be mentioned natural rubber, synthetic polyisoprene, polybutadiene, a styrene-butadiene copolymer, a styrene-isoprene copolymer, a styrene-isoprene-butadiene copolymer, an acrylonitrile-butadiene copolymer, a partially hydrogenated product of an acrylonitrile-butadiene copolymer, an isobutylene-isoprene copolymer and an ethylene-propylene-diene copolymer, and mixtures of these rubbers. These rubbers may be used after an oil extender is previously added therein.

A preferable diene units-containing rubber (C) is a styrene-butadiene copolymer, prepared by emulsion polymerization or solution polymerization, and comprising 0 to 60% by weight, preferably 5 to 50% by weight and more preferably 15 to 45% by weight of styrene units.

The amount of the diene rubber (C) is not larger than 500 parts by weight, preferably not larger than 400 parts by weight, based on 100 parts by weight of the diene rubber (A).

The rubber composition of the present invention may further comprise a rubber having no diene units such as acrylic rubber, epichlorohydrin rubber, polyether, fluororubber, silicone rubber, ethylene-propylene rubber and urethane rubber.

The rubber composition of the present invention may comprise a reinforcing agent. Preferable reinforcing agents are silica and carbon black. Silica and carbon black may be used as a combination of the two reinforcing agents.

The amount of the reinforcing agent is in the range of 10 to 200 parts by weight, preferably 20 to 150 parts by weight and more preferably 40 to 100 parts by weight, based on 100 parts by weight of the diene rubber (A) (when the diene rubber (A) is used alone as diene rubber) or based on 100 parts by weight of the total of the diene rubber (A) and the diene rubber (B) and/or the diene units-containing rubber (C) (when the diene rubber (B) and/or the diene units-containing rubber (C) is used in combination with the diene rubber (A)). When silica and carbon black are used in combination, the total amount of the two reinforcing agent is preferably in the range of 10 to 200 parts by weight.

The silica used is not particularly limited, and includes, for example, dry white carbon, wet white carbon, colloidal silica, and precipitated silica which is described in JP-A S62-62838. Of these, wet white carbon predominantly comprised of hydrous silica is preferable. Carbon black having silica supported on the surface thereof, such as a carbon-silica dual phase filler, can also be used. The silica may be used either alone or as a combination of at least two kinds thereof.

The nitrogen adsorption specific surface area of silica (BET method) is preferably in the range of 50 to 400 $m^2/g$, more preferably 100 to 220 $m^2/g$ and especially preferably 120 to 190 $m^2/g$. When the specific surface area of silica is in this range, a rubber vulcanizate has improved mechanical strength, abrasion resistance and low heat-build up. The nitrogen adsorption specific surface area is measured by the BET method according to ASTM D3037. Silica preferably has an acidic pH, i.e., a pH value smaller than 7, more preferably in the range of 5 to 6.9.

A silane coupling agent can be added in combination with silica. By the addition of a silane coupling agent, heat-build up of a rubber vulcanizate is more reduced and abrasion resistance thereof is more enhanced. The silane coupling agent is not particularly limited, and, as specific examples thereof, there can be mentioned vinyltriethoxysilane, β-(3, 4-epoxycyclohexyl)ethyltrimethoxysilane, N-(β-aminoethyl)-γ-aminopropyltrimethoxysilane, bis(3-(triethoxysilyl)-propyl)tetrasulfide, bis(3-(triethoxysilyl)propyl)disulfide, and tetrasulfides described in JP-A H6-248116, such as β-trimethoxysilylpropyldimethylthiocarbamyltetrasulfide and β-trimethoxysilylpropylbenzothiazyltetrasulfide. To avoid scorch at kneading, a silane coupling agent having not more than 4 sulfur atoms in the molecule is preferable.

The silane coupling agent may be used either alone or as a combination of at least two thereof. The amount of silane coupling agent is preferably in the range of 0.1 to 30 parts by weight, more preferably 0.5 to 20 parts by weight and especially preferably 1 to 15 parts by weight, based on 100 parts by weight of silica.

The carbon black is not particularly limited, and includes, for example, furnace black, acetylene black, thermal black, channel black and graphite. Of these, furnace black is preferable. As specific examples of furnace black, there can be mentioned SAF, ISAF, ISAF-HS, ISAF-LS, IISAF-HS, HAP, HAF-HS, HAF-LS and FEF. The carbon black may be used either alone or as a combination of at least two thereof.

The carbon black preferably has a nitrogen adsorption specific surface area ($N_2SA$) in the range of 5 to 200 $m^2/g$ and more preferably 80 to 130 $m^2/g$. The carbon black preferably has a dibutyl phthalate (DBP) absorption in the range of 5 to 300 ml/100 g and more preferably 80 to 160 ml/100g. When $N_2SA$ and DBP are in the above range, a rubber vulcanizate has improved mechanical strength and abrasion resistance.

The carbon black may be high-structure carbon black as described in JP-A H5-230290, which has a cetyltrimethylammonium bromide (CTAB) adsorption specific surface area in the range of 110 to 170 $m^2/g$, and a DBP absorption (24M4DBP) in the range of 110 to 130 ml/100 g as measured after a compression under a pressure of 165 MPa is repeated four times. The high-structure carbon black gives a rubber vulcanizate having improved abrasion resistance.

The rubber composition of the present invention may comprise desired amounts of other conventional ingredients such as a vulcanizing agent, a vulcanization accelerator, an accelerator activator, an antioxidant, an activator, a process oil, a plasticizer, a lubricant and a filler.

As specific examples of the vulcanizing agent, there can be mentioned sulfur such as powdery sulfur, precipitate sulfur, colloidal sulfur, insoluble sulfur and highly dispersible sulfur; sulfur halides such as sulfur monochloride and sulfur dichloride; organic peroxides such as dicumyl peroxide and di-tert,butyl peroxide, quinone dioximes such as p-quinone dioxime and p,p'-dibenzoylquinone dioxime; organic polyamine compounds such as triethylenetetramine, hexamethylenediamine carbamate and 4,4'-methylenebis-o-chloroaniline; and an alkyl phenol resin having methylol groups. Of these, sulfur is preferable. Powdery sulfur is especially preferable. The sulfur may be used either alone as a combination of at least two kinds thereof. The amount of the vulcanizing agent is preferably in the range of 0.1 to 15 parts by weight and more preferably 0.5 to 5 parts by weight, based on 100 parts by weight of the total rubber ingredients, in view of the low heat-build up, high mechanical strength and good abrasion resistance.

As specific examples of the vulcanization accelerator, there can be mentioned sulfonamide vulcanization accelerators such as N-cyclohexyl-2-benzothiazylsulfenamide, N-t-butyl-2-beonzothiazolesulfenamide, N-oxyethylene-2-benzothiazolesulfenamide, N-oxyethylene-2-benzothiazolesulfenamide and N,N'-diisopropyl-2-benzothiazolesulfenamide: guanidine vulcanization accelerators such as diphenylguanidine, diorthotolylguanidine and orthotolylbiguanidine; thiourea vulcanization accelerators such as diethylthioureac; thiazole vulcanization accelerators such as 2-mercaptobenzothiazole, dibenzothiazyldisulfide and 2-mercaptobenzothiazole zinc salt; thiuram vulcanization accelerators such as tetramethylthiuram monosulfide and tetramethylthiuram disulfide; dithiocarbamate vulcanizing agents such as sodium dimethyldithiocarbamate and zinc diethyldithiocarbamate and xanthogenate vulcanization accelerators such as sodium isopropylxanthogenate, zinc isopropylxanthogenate and zinc butylxanthogenate. These vulcanization accelerators may be used either alone or as a combination of at least two kinds thereof. Of these, sulfenamide vulcanization accelerators are preferable. The amount of the vulcanization accelerator is preferably in the range of 0.1 to 15 parts by weight and more preferably 0.5 to 5 parts by weight, based on 100 parts by weight of the total rubber ingredients.

The accelerator activator includes, for example, higher fatty acids such as stearic acid, and zinc oxide. Among the zinc oxides, finely divided zinc oxide particles with a particle diameter not larger than 5 $\mu m$, which have a high surface activity, are preferable, and, as specific example thereof, there can be mentioned active zinc flower having a particle diameter in the range of 0.05 to 0.2 $\mu m$, and zinc flower having a particle diameter in the range of 0.3 to 1 $\mu m$. Zinc oxide which have been surface-treated with an amine dispersing agent or a wetting agent can also be used. The amount of the accelerator activator can be appropriately chosen, but, in the case of a higher fatty acid, its amount is preferably in the range of 0.05 to 15 parts by weight and more preferably 0.5 to 5 parts by weight. In the case of zinc oxide, its amount is preferably in the range of 0.05 to 10 parts by weight and more preferably 0.5 to 3 parts by weight.

The process oil includes mineral oil and synthetic oil. As the mineral oil, there can be usually used aromatic oil, naphthenic oil and parrafinic oil.

Other ingredients may be incorporated, which include, for example, activators such as diethylene glycol, polyethylene glycol and silicone oil; fillers such as calcium carbonate, talc, clay and aluminum hydroxide; tackifiers such as a resin: and waxes.

The rubber composition of the present invention can be prepared by kneading the ingredients by the conventional procedure. For example, rubbers and the ingredients other than a vulcanizing agent and a vulcanizing accelerator are kneaded together, and thereafter, a vulcanizing agent and a vulcanizing accelerator are mixed with the kneaded mixture to give a vulcanizable rubber composition. The kneading of rubbers and the ingredients other than a vulcanizing agent and a vulcanizing accelerator is carried out preferably at a temperature of 80 to 200° C. and more preferably at 120 to 180° C., and for a time of 30 seconds to 30 minutes. The mixing of a vulcanizing agent and a vulcanizing accelerator is carried out after the kneaded mixture is cooled usually to a temperature of not higher than 100° C. and preferably not higher than 80° C.

The rubber composition of the present invention is put to a practical use usually as a rubber vulcanizate. The method for vulcanizing the rubber composition is not particularly limited and can be appropriately chosen depending upon the particular shape and size of a vulcanizate or other factors. A method of molding simultaneously with vulcanization can be adopted wherein a vulcanizable rubber composition is filled in a mold and then heated. A method of molding and then vulcanizing can also be adopted wherein a previously molded rubber article is heated for vulcanization. The vulcanization temperature is preferably in the range of 120 to 200° C. and more preferably 140 to 180° C. The vulcanization time is usually in the range of about 1 to 120 minutes.

EXAMPLES

The invention will now be described specifically by the following examples and comparative examples wherein % and parts are by weight unless otherwise specified. Properties of a polymer, a rubber composition and a rubber vulcanizate were evaluated by the following methods.

(1) Bound Styrene Content and Vinyl Bond Content in Polymer

These contents were measured by $^1$H-NMR.

(2) Mooney Viscosity

Mooney viscosity of rubber was measured according to JIS K6300.

(3) Weight Average Molecular Weight (Mw), Number Average Molecular Weight (Mn) and Peak Top molecular Weight (Np) of Polymer These molecular weights were measured by gel permeation chromatography (GPC) and Mw, Mp, Mw/Mn and Mw/Mp were expressed in terms of those of standard polystyrene. In the GPC, a chromatograph "HLC-8020" available from Tosoh Corporation was used with two columns "GMH-HR-H" available from Tosoh Corporation which were connected to each other. A differential refractometer "RI-8020" available from was used as a detector.

(4) Mechanical Property of Rubber Vuloanizate

Tensile strength of a rubber vulcanizate was expressed by a modulus at a 300% elongation as measured according to JIS K6301. The larger the 300% modulus, the better the rubber vulcanizate.

(5) Abrasion Resistance

Pico abrasion test was carried out according to JIS K6264. The larger the abrasion resistance index, the better the abrasion resistance.

(6) Electric Power for Kneading

An electric power required for kneading using Banbury mixer was measured. The smaller the electric power, the better the processability.

(7) Black Incorporation Time (BIT)

Using a curve showing an electric power change as made at kneading using Banbury mixer, a time spanning from the incorporation of a reinforcing agent to occurrence of the second peak was measured.

In the case when a reinforcing agent such as carbon black is incorporated at a time, an electric power-time curve with two peaks is obtained. Free reinforcing agent substantially disappears in the vicinity of the second peak, and therefore, the time spanning from the Incorporation of a reinforcing agent to the occurrence of the second peak (which time is abbreviated to as "BIT") can be a criterion for the rate of incorporation of a reinforcing agent, namely, for the processability of a rubber composition. The smaller the BIT value, the better the processability.

Production of Diene Rubber (A) and Comparative Diene Rubber

Example 1 (Polymer a)

An autoclave equipped with a stirrer was charged with 4,000 parts of cyclohexane, 190 parts of styrene, 510 parts of 1,3-butadiene and 2.0 parts of tetramethylethylenediamine. Then n-butyllithium was added to treat the content until catalyst-deactivating ingredients disappeared. Thereafter 0.092 part of n-butyllithium as a catalytically active ingredient for polymerization was added to initiate polymerization at 45° C. When 30 minutes elapsed from the initiation of polymerization (the polymerization conversion at this time was 23% as calculated based on the total amounts of monomers including the monomers added later), an additional monomer mixture of 60 parts of styrene and 240 parts of 1,3-butadiene was continuously added over a period of 90 minutes, in which monomer mixture water had been previously added in an amount such that 25% by mole of the active terminal for polymerization was deactivated. At the completion of addition of the additional monomer mixture, the polymerization conversion was 80%. After confirmation of the fact that the polymerization conversion reached 100%, 0.013 part of tetramethoxysilane was added and a reaction was carried out for 30 minutes. Then 0.09 part of methanol was added to terminate the polymerization to give a solution of polymer a. The highest temperature reached during polymerization was 65° C. The molecular weight and structure of polymer a are shown in Table 1.

Example 2 (Polymer b)

Polymerization was carried out by the same procedures as described in Example 1 except that an additional monomer mixture of styrene and 1,3-butadiene, in which water had been previously added in an amount such that 30% by mole of the active terminal for polymerization was deactivated, was continuously added when 30 minutes elapsed from the initiation of polymerization, whereby a solution of polymer b was obtained. All other conditions remained the same. The polymerization conversion at the completion of addition of the additional monomer mixture was 76%. The molecular weight and structure of polymer b are shown in Table 1.

Example 3 (Polymer c)

Polymerization was carried out by the same procedures as described in Example 1 except that an additional monomer mixture, in which N-methyl-ε-caprolactam instead of water had been previously added in an amount such that 23% by mole of the active terminal for polymerization was deactivated, was used with all other conditions remaining the same, whereby a solution of polymer c was obtained. The polymerization conversion at the completion of addition of the additional monomer mixture was 82%. The molecular weight and structure of polymer c are shown in Table 1.

Example 4 (Polymer d)

An autoclave equipped with a stirrer was charged with 4,000 parts of cyclohexane, 320 parts of styrene, 380 parts of 1,3-butadiene and 0.14 parts of tetramethylethylenediamine. Then n-butyllithium was added to treat the content until catalyst-deactivating ingredients disappeared. Thereafter 0.092 part of n-butyllithium as a catalytically active ingredient for polymerization was added to initiate polymerization at 45° C. When 30 minutes elapsed from the initiation of polymerization (the polymerization conversion at this time was 24% as calculated based on the total amounts of monomers including the monomers added later), an additional monomer mixture of 30 parts of styrene and 270 parts of 1,3-butadiene was continuously added over a period of 90 minutes, in which monomer mixture 4,4'-bis(diethylamino) benzopphenone had been previously added in an amount such that 25% by mole of the active terminal for polymerization was deactivated. At the completion of addition of the additional monomer mixture, the polymerization conversion was 78%. After confirmation of the fact that the polymerization conversion reached 100%, 0.020 part of tetramethoxysilane was added and a reaction was carried out for 30 minutes. Then 0.09 part of methanol was added to terminate the polymerization to give a solution of polymer d. The highest temperature reached during polymerization was 65° C. The molecular weight and structure of polymer d are shown in Table 1.

Comparative Example 1 (Polymer e)

An autoclave equipped with a stirrer was charged with 4,000 parts of cyclohexane, 250 parts of styrene, 750 parts of 1,3-butadiene and 2.0 parts of tetramethylethylenediamine. Then n-butyllithium was added to treat the content until catalyst-deactivating ingredients disappeared. Thereafter 0.092 part of n-butyllithium as a catalytically active ingredient for polymerization was added to initiate polymerization at 45° C. After confirmation of the fact that the polymerization conversion reached 100%, 0.09 part of methanol was added to terminate the polymerization to give a solution of polymer e. The highest temperature reached during polymerization was 65° C. The molecular weight and structure of polymer e are shown in Table 1.

Comparative Example 2 (Polymer f)

An autoclave equipped with a stirrer was charged with 4,000 parts of cyclohexane, 190 parts of styrene, 510 parts of 1,3-butadiene and 1.1 parts of tetramethylethylenediamine. Then n-butyllithium was added to treat the content until catalyst-deactivating ingredients disappeared. Thereafter 0.23 part of n-butyllithium as a catalytically active ingredient for polymerization was added to initiate polymerization at 45° C. When 20 minutes elapsed from the initiation of polymerization (the polymerization conversion at this time was 33% as calculated based on the total amounts of monomers including the monomers added later), an additional monomer mixture of 60 parts of styrene and 240 parts of 1,3-butadiene was continuously added over a period of 60 minutes, in which monomer mixture water had been previously added in an amount such that 7% by mole of the active terminal for polymerization was deactivated. At the completion of addition of the additional monomer mixture, the polymerization conversion was 85%. After confirmation of the fact that the polymerization conversion reached 100%, 0.11 part of tetramethoxysilane was added and a reaction was carried out for 30 minutes. Then 0.25 part of methanol was added to terminate the polymerization to give a solution of polymer f. The highest temperature reached during polymerization was 65° C. The molecular weight and structure of polymer f are shown in Table 1.

Comparative Example 3 (Polymer g)

Three autoclaves each equipped with a stirrer were connected in series. The first autoclave was charged with 100 parts of a monomer mixture comprised of styrene and 1,3-butadiene at a mixing ratio of 25/75, 670 parts of cyclohexane, 0.17 part of tetramethylethylenediamine, 0.034 part of n-butyllithium, and 1,2-butadiene-in an amount such that 7% by mole of the active terminal for polymerization was deactivated. Continuous polymerization was carried out while the monomer charge was continuously fed at a rate such that the average residence time in each autoclave was 2 hours. The temperatures in the first autoclave and the second autoclave were maintained at 55° C. and 70° C., respectively. In the third autoclave, 0.16 part of tetramethoxysilane was added, and after completion of reaction 0.5 part of methanol as a polymerization stopper was added to give a solution of polymer g. The molecular weight and structure of polymer g are shown in Table 1.

Comparative Example 4 (Polymer h)

An autoclave equipped with a stirrer was charged with 4,000 parts of cyclohexane, 320 parts of styrene, 380 parts of 1,3-butadiene and 0.31 part of tetramethylethylenediamine. Then n-butyllithium was added to treat the content until catalyst-deactivating ingredients disappeared. Thereafter 0.21 part of n-butyllithium as a catalytically active ingredient for polymerization was added to initiate polymerization at 45° C. When 20 minutes elapsed from the initiation of polymerization (the polymerization conversion at this time was 31% as calculated based on the total amounts of monomers including the monomers added later), an additional monomer mixture of 30 parts of styrene and 270 parts of 1,3-butadiene was continuously added over a period of 60 minutes, in which monomer mixture water had been previously added in an amount such that 8% by mole of the active terminal for polymerization was deactivated. At the completion of addition of the additional monomer mixture, the polymerization conversion was 84%. After confirmation of the fact that the polymerization conversion reached 100%, 0.125 part of tetramethoxysilane was added and a reaction was carried out for 30 minutes. Then 0.2 part of methanol was added to terminate the polymerization to give a solution of polymer h. The highest temperature reached during polymerization was 65° C. The molecular weight and structure of polymer h are shown in Table 1.

Production of Low-Molecular-Weight Diene Rubber (B)

Production Example 1 (Polymer i)

An autoclave equipped with a stirrer was charged with 4,000 parts of cyclohexane, 23 parts of styrene, 28 parts of 1,3-butadiene and 44 parts of tetramethylethylenediamine. Then 20 parts of n-butyllithium was added to initiate polymerization at 40° C. When 5 minutes elapsed from the initiation of polymerization, an additional monomer mixture comprised of 427 parts of styrene and 522 parts of 1,3-butadiene was continuously added over a period of 90 minutes. At the completion of addition of the additional monomer mixture, the polymerization conversion was 93%. After confirmation of the fact that the polymerization conversion reached 100%, 20 parts of methanol was added to terminate the polymerization to give a solution of polymer i. The highest temperature reached during polymerization was 55° C. The molecular weight and structure of polymer i are shown in Table 1.

Production Example 2 (Polymer j)

Polymerization was carried out by the same procedures as described in Production Example 1 except that the amount of tetramethylethylenediamine was changed to 6.0 parts and the amount of n-butyllithium was changed to 3.3 parts with all other conditions remaining the same, whereby a solution of polymer j was obtained. The molecular weight and structure of polymer j are shown in Table 1.

Production Example 3 (Polymer k)

Polymerization was carried out by the same procedures as described in Production Example 1 except that the amounts of styrene and 1,3-butadiene in the initial monomer charge were changed to 23 parts and 37 parts, respectively; the amounts of styrene and 1,3-butadiene in the additional monomer mixture were changed to 327 parts and 613 parts, respectively; the amount of tetramethylethylenediamine was changed to 9.3 parts; and the amount of n-butyllithium was changed to 8.5 parts. All other conditions remained the same. Thus, a solution of polymer k was obtained. The molecular weight and structure of polymer k are shown in Table 1.

Production Example 4 (Polymer l)

Polymerization was carried out by the same procedures as described in Production Example 2 except that the amounts of styrene and 1,3-butadiene in the initial monomer charge were changed to 14 parts and 36 parts, respectively, and the amounts of styrene and 1,3-butadiene in the additional monomer mixture were changed to 236 parts and 714 parts, respectively, with all other conditions remaining the same. Thus, a solution of polymer l was obtained. The molecular weight and structure of polymer l are shown in Table 1.

Production of Rubber Composition and Rubber Vulcanizate

Example 5, Comparative Example 5 and 6

To the solution of 100 parts of polymer a obtained in Example 1, 0.23 part of 2,4-bis(n-octylthiomethyl)-6-methylphenol was added and the mixture was stirred for 30 minutes. Then 37.5 parts of process oil ("Flex M", available from Fuji Kosan K. K., CA 43%) was added and the mixture was stirred for 10 minutes. The mixture was subjected to steam stripping to recover a polymer. The recovered polymer was dehydrated by a roll and then dried by a hot air dryer to prepare a rubber composition. Prior to the stripping, 20 ppm of polyoxyethylene-polyoxypropylene-ether (ethylene oxide-propylene oxide block copolymer) was added to water used for stripping, and the amount of water used for stripping was such that the concentration of the rubber composition in the form of crumb was 5%.

Using a 250 ml volume Banbury mixer (Banbury mixer "BR250" equipped in "Labo-plastomill C" available from Toyo Seiki Seisakusho K. K.), 150 parts of the above-mentioned rubber composition was masticated for 30 seconds. Then 80 parts of carbon black ("Seast 6" available from Tokai Carbon K. K.), 3 parts of zinc oxide (zinc flower #1, available from Honjo Chemical Co., particle size: 0.4 µm), 2 parts of stearic acid and 2 parts of an antioxidant ("Nocrac 6C (6PPD)" available from Ouchi Shinko Chem. Ind. Co.) were added, and the rubber composition was kneaded for 3.5 minutes at a kneading initiation temperature of 80° C. Electric power for kneading and BIT were measured.

To the thus-obtained mixture, 1.4 parts of sulfur, and a vulcanization accelerator (a mixture of 1.2 parts of N-cyclohexyl-2-benzothiazylsulfenamide (CBS) and 0.3 part of diphenylguanidine (DPG)) were added, and the mixture was kneaded at 50° C. by an open roll and then press-cured at 160° C. for 30 minutes to prepare a specimen. Properties of the specimen were evaluated.

In Comparative Examples 5 and 6, the above-mentioned procedures in Example 5 were repeated wherein polymer e and polymer f were used, respectively, as rubber ingredients instead of polymer a to prepare rubber compositions, with all other conditions remaining the same. The obtained rubber compositions were press-cured to prepare specimens and their properties were evaluated.

The evaluation results are shown in Table 2. The measured values were expressed in terms of indexes as the value obtained in Comparative Example 5 was 100.

TABLE 1

|  | Example 1 | Example 2 | Example 3 | Example 4 | Comp. Ex. 1 | Comp. Ex. 2 | Comp. Ex. 3* | Comp. Ex. 4 | Prod. Ex. 1 | Prod. Ex. 2 | Prod. Ex. 3 | Prod. Ex. 4 |
|---|---|---|---|---|---|---|---|---|---|---|---|---|
| Rubber structure |  |  |  |  |  |  |  |  |  |  |  |  |
| Kind of rubber | a | b | c | d | e | f | g | h | i | j | k | l |
| Styrene content (%) | 25 | 25 | 25 | 35 | 25 | 25 | 25 | 35 | 45 | 45 | 35 | 25 |
| Vinyl bond cont. (%) | 60 | 61 | 60 | 40 | 59 | 60 | 60 | 42 | 51 | 52 | 40 | 65 |
| Mp × 1000 | 94.7 | 104.9 | 86.5 | 92.3 | 77.4 | 136.1 | 64.7 | 157.9 | — | — | — | — |
| Mw × 1000 | 85.5 | 84.8 | 74.9 | 86.5 | 85 | 87.6 | 97 | 99.2 | 0.72 | 3.1 | 1.7 | 3.1 |
| Mw/Mn | 1.69 | 2.14 | 1.65 | 1.78 | 1.02 | 1.54 | 2.6 | 1.59 | 1.03 | 1.04 | 1.03 | 1.07 |
| Mw/Mp | 0.9 | 0.81 | 0.87 | 1.07 | 0.91 | 0.64 | 1.5 | 0.63 | — | — | — | — |

*Continuous polymerization in Comparative Example 3

TABLE 2

|  | Example 5 | Comp. Ex. 5 | Comp. Ex. 6 |
|---|---|---|---|
| Production of rubber composition |  |  |  |
| High-molecular-weight rubber (parts) | a<br>100 | e<br>100 | g<br>100 |
| Low-molecular-weight rubber (parts) | — | — | — |
| Oil extender (parts) | 37.5 | 37.5 | 37.5 |
| Composition (parts) |  |  |  |
| Carbon black | 80 | 80 | 80 |
| Zinc oxide | 3 | 3 | 3 |

TABLE 2-continued

|  | Example 5 | Comp. Ex. 5 | Comp. Ex. 6 |
|---|---|---|---|
| Stearic acid | 2 | 2 | 2 |
| Antioxidant | 2 | 2 | 2 |
| Sulfur | 1.4 | 1.4 | 1.4 |
| CBS | 1.2 | 1.2 | 1.2 |
| DPG | 0.3 | 0.3 | 0.3 |
| Physical properties |  |  |  |
| Electric power for kneading | 84 | 100 | 83 |
| BIT | 70 | 100 | 77 |
| Modulus at 300% elongation | 105 | 100 | 68 |
| Abrasion resistance | 136 | 100 | 102 |

As seen from Table 2, in the case of rubber compositions comprising a diene rubber and an oil extender, when the diene rubber is a diene rubber of the present invention (polymer a), the rubber composition has good processability and the rubber vulcanizate has high tensile strength and good abrasion resistance. In contrast, when the diene rubber is a diene rubber with too small Mw/Mn (polymer e), the rubber composition has poor processability and the rubber vulcanizate has poor abrasion resistance. When the diene rubber is a diene rubber with too large Mw/Mn and too large Mw/Mp (polymer f), the rubber vulcanizate has low tensile strength and poor abrasion resistance.

Example 6

In a vessel equipped with a stirrer, the solution of 100 parts of polymer a obtained in Example 1 was placed, and the solution of 37.5 parts of polymer i obtained in Production Example 1 was added in a solution form. Then 0.23 part of 2,4-bis(n-octylthiomethyl)-6-methylphenol was added and the mixture was stirred for 30 minutes. Then 12.5 parts of process oil ("Flex M") was added and the mixture was stirred for 10 minutes, The mixture was subjected to steam stripping to recover a polymer. The recovered polymer was dehydrated by a roll and then dried by a hot air dryer to prepare a rubber composition. Prior to the stripping, 20 ppm of polyoxyethylene-polyoxypropylene-ether was added to water used for stripping, and the amount of water used for stripping was such that the concentration of the rubber composition in the form of crumb was 5%.

Using a 250 ml volume Banbury mixer ("BR250"), 150 parts of the above-mentioned rubber composition was masticated for 30 seconds. Then 95 parts of carbon black ("Seast 7HM" available from Tokai Carbon K. K.), 3 parts of zinc oxide (zinc flower #1), 2 parts of stearic acid and 2 parts of an antioxidant (6PPD) were added, and the rubber composition was kneaded for 3.5 minutes at a kneading initiation temperature of 80° C. Electric power for kneading and BIT were measured.

To the thus-obtained mixture, 1.5 parts of sulfur, and a vulcanization accelerator (a mixture of 1.2 parts of CBS and 0.3 part of DPG) were added, and the mixture was kneaded at 50° C. by an open roll and then press-cured at 160° C. for 30 minutes to prepare a specimen. Properties of the specimen were evaluated. The evaluation results are shown in Table 3.

Examples 7–9 and Comparative Examples 7–10

By the same procedures as described in Example 6, rubber compositions having the compositions shown in Table 3 were prepared, and press-cured to prepare specimens. Properties of the specimen were evaluated. The evaluation results are shown in Table 3. The measured values were expressed in terms of indexes as the value obtained in Comparative Example 7 was 100.

TABLE 3

|  | Example 6 | Example 7 | Example 8 | Example 9 |
|---|---|---|---|---|
| Production of rubber composition |  |  |  |  |
| High-molecular-weight rubber (parts) | a 100 | b 100 | a 100 | c 100 |
| Low-molecular-weight rubber (parts) | 1 37.5 | 1 37.5 | j 37.5 | i 37.5 |
| Oil extender (parts) | 12.5 | 12.5 | 12.5 | 12.5 |
| Composition (parts) |  |  |  |  |
| Carbon black | 95 | 95 | 95 | 95 |
| Zinc oxide | 3 | 3 | 3 | 3 |
| Stearic acid | 2 | 2 | 2 | 2 |
| Antioxidant | 2 | 2 | 2 | 2 |
| Sulfur | 1.5 | 1.5 | 1.5 | 1.5 |
| CBS* | 1.2 | 1.2 | 1.2 | 1.2 |
| DPG** | 0.3 | 0.3 | 0.3 | 0.3 |
| Physical properties |  |  |  |  |
| Electric power for kneading | 80 | 81 | 84 | 85 |
| BIT | 72 | 74 | 74 | 77 |
| Modulus at 300% elongation | 100 | 103 | 127 | 108 |
| Abrasion resistance | 138 | 140 | 147 | 140 |

|  | Comp. Ex. 7 | Comp. Ex. 8 | Comp. Ex. 9 | Comp. Ex. 10 |
|---|---|---|---|---|
| Production of rubber composition |  |  |  |  |
| High-molecular-weight rubber (parts) | e 100 | f 100 | f 100 | g 100 |
| Low-molecular-weight rubber (parts) | i 37.5 | i 37.5 | k 37.5 | l 37.5 |
| Oil extender (parts) | 12.5 | 12.5 | 12.5 | 12.5 |
| Composition (parts) |  |  |  |  |
| Carbon black | 95 | 95 | 95 | 95 |
| Zinc oxide | 3 | 3 | 3 | 3 |
| Stearic acid | 2 | 2 | 2 | 2 |
| Antioxidant | 2 | 2 | 2 | 2 |
| Sulfur | 1.5 | 1.5 | 1.5 | 1.5 |
| CBS* | 1.2 | 1.2 | 1.2 | 1.2 |
| DPG** | 0.3 | 0.3 | 0.3 | 0.3 |
| Physical properties |  |  |  |  |
| Electric power for kneading | 100 | 85 | 83 | 76 |
| BIT | 100 | 72 | 73 | 84 |
| Modulus at 300% elongation | 100 | 78 | 68 | 70 |
| Abrasion resistance | 100 | 125 | 108 | 113 |

*Vulcanization accelerator: N-cyclohexyl-2-benzothiazylsulfenamide
**Vulcanization Accelerator: Diphenylguanidine As seen from Table 3, in the case of rubber compositions comprising a high-molecular-weight diene rubber, a low-molecular-weight diene rubber and an oil extender, when the high-molecular-weight diene rubber is a diene rubber of the present invention (polymer a, polymer b or polymer c), the rubber compositions have good processability and the rubber vulcanizates have high tensile strength and good abrasion resistance. In contrast, when the high-molecular-weight diene rubber is a diene rubber with too small Mw/Mn (polymer e), the rubber composition has poor processability and the rubber vulcanizate has poor abrasion resistance. When the high-molecular-weight diene rubber is a diene rubber with too small Mw/Mp (polymer f), the rubber vulcanizate has poor abrasion resistance. When the high-molecular-weight diene rubber is a diene rubber with too large Mw/Mn and too large Mw/Mp (polymer g), the rubber vulcanizate has low tensile strength and poor abrasion resistance.

Example 10, Comparative Example 11

By the same procedures as described in Example 6, rubber compositions having the compositions shown in Table 4 were prepared.

Using a 250 ml volume Banbury mixer ("BR250"), 150 parts of each of the above-mentioned rubber compositions was masticated for 30 seconds. Then 53 parts of silica ("Ultrasil-7000GR", available from Degussa Co.) and 6.4 parts of a silane coupling agent ("Si69", available from Degussa Co.) were added, and the rubber composition was kneaded for 2 minutes at a kneading initiation temperature of 110+ C. Further, 27 parts of silica, 3 parts of zinc oxide (zinc flower #1), 2 parts of stearic acid and 2 parts of an antioxidant (6PPD) were added, and the mixture was kneaded for 2 minutes. Electric power for kneading was measured. The mixture had a temperature of 150° C. at the completion of kneading. The mixture was cooled to room temperature, and again kneaded for 3 minutes at a kneading initiation temperature of 110° C. To the thus-obtained mixture, 1.4 parts of sulfur, and a vulcanization accelerator (a mixture of 1.8 parts of CBS and 1.7 parts-of DPG) were added, and the mixture was kneaded at 50° C. by an open roll and then press-cured at 160° C. for 30 minutes to prepare a specimen. Properties of the specimen were evaluated. The evaluation results are shown in Table 4. The measured values were expressed in terms of indexes as the value obtained in Comparative Example 11 was 100.

TABLE 4

|  | Example 10 | Comp. Ex. 11 |
| --- | --- | --- |
| Production of rubber composition |  |  |
| High-molecular-weight rubber | d | h |
| (parts) | 100 | 100 |
| Low-molecular-weight rubber | l | l |
| (parts) | 50 | 50 |
| Oil extender (parts) | 0 | 0 |
| Composition (parts) |  |  |
| Silica | 80 | 80 |
| Silane coupling agent | 6.4 | 6.4 |
| Zinc oxide | 3 | 3 |
| Stearic acid | 2 | 2 |
| Antioxidant | 2 | 2 |
| Sulfur | 1.5 | 1.5 |
| CBS | 1.8 | 1.8 |
| DPG | 1.7 | 1.7 |
| Physical properties |  |  |
| Electric power for kneading | 100 | 100 |
| Modulus at 300% elongation | 105 | 100 |
| Abrasion resistance | 108 | 100 |

As seen from Table 4, in the case of rubber compositions comprising a high-molecular-weight diene rubber and a low-molecular-weight diene rubber, when the high-molecular-weight diene rubber is a diene rubber of the present invention (polymer d), the rubber compositions have good processability and the rubber vulcanizates have high tensile strength and good abrasion resistance. In contrast, when the high-molecular-weight diene rubber is a diene rubber with too small Mw/Mp (polymer h), the rubber vulcanizate has low tensile strength and poor abrasion resistance.

Example 11, Comparative Example 12

In a vessel equipped with a stirrer, the solution of 40 parts of polymer a obtained in Example 1 or the solution of 40 parts of polymer e obtained in Comparative Example 1 was placed, and the solution of 15 parts of polymer j obtained in Production Example 2 was added in a solution form. Then 0.23 part of 2,4-bis(n-octylthiomethyl)-6-methylphenol was added and the mixture was stirred for 30 minutes. A polymer was recovered from the mixture and dried to prepare a rubber composition by the same procedures as described in Example 6.

Using a 250 ml volume Banbury mixer ("BR250"), 82.5 parts of a styrene-butadiene copolymer rubber (styrene units content: 23.5%, oil extender content: 27.3%, "Nipol SBR 1712" available from Zeon Corporation) was added to the above-mentioned rubber composition, and the mixture was masticated for 30 seconds. Then 45 parts of silica ("Zeosil 1165MP", available from Rhodia Co.) and 3.6 parts of a silane coupling agent ("Si69") were added, and the rubber composition was kneaded for 2 minutes at a kneading initiation temperature of 110° C. Further, 30 parts of carbon black N220 ("Seast 6" available from Tokai Carbon Co.), 3 parts of zinc oxide (zinc flower #1), 2 parts of stearic acid and 2 parts of an antioxidant (6PPD) were added, and the mixture was kneaded for 2 minutes. Electric power for kneading was measured. The mixture had a temperature of 150° C. at the completion of kneading. The mixture was cooled to room temperature, and again kneaded for 3 minutes at a kneading initiation temperature of 110° C. To the thus-obtained mixture, 1.5 parts of sulfur, and a vulcanization accelerator (a mixture of 1.8 parts of CBS and 1.0 part of DPG) were added, and the mixture was kneaded at 50° C. by an open roll and then press-cured at 160° C. for 30 minutes to prepare a specimen. Properties of the specimen were evaluated. The evaluation results are shown in Table 5. The measured values were expressed in terms of indexes as the value obtained in Comparative Example 12 was 100.

TABLE 5

|  | Example 11 | Comp. Ex. 12 |
| --- | --- | --- |
| Production of rubber composition |  |  |
| High-molecular-weight rubber | a | e |
| (parts) | 40 | 40 |
| Low-molecular-weight rubber | j | j |
| (parts) | 15 | 15 |
| Oil extender (parts) | 0 | 0 |
| SBR * (parts) | 82.5 | 82.5 |
| Composition (parts) |  |  |
| Silica | 45 | 45 |
| Carbon black | 30 | 30 |
| Silane coupling agent | 3.6 | 3.6 |
| Zinc oxide | 3 | 3 |
| Stearic acid | 2 | 2 |
| Antioxidant | 2 | 2 |
| Sulfur | 1.5 | 1.5 |
| CBS | 1.8 | 1.8 |
| DPG | 1 | 1 |

TABLE 5-continued

|  | Example 11 | Comp. Ex. 12 |
|---|---|---|
| Physical properties |  |  |
| Electric power for kneading | 93 | 100 |
| Modulus at 300% elongation | 105 | 100 |
| Abrasion resistance | 115 | 100 |

\* SBR: Nipol SBR 1712, Zeon Corporation
(St content: 23.5 wt. %, oil extender content: 27.3%)

As seen from Table 5, in the case of rubber compositions comprising a high-molecular-weight diene rubber and a low-molecular-weight diene rubber, when the high-molecular-weight diene rubber is a diene rubber of the present invention (polymer a), the rubber composition has good processability and the rubber vulcanizate has high tensile strength and good abrasion resistance. In contrast, when the high-molecular-weight diene rubber is a diene rubber with too small Mw/Mn (polymer e), the rubber composition has poor processability and the rubber vulcanizate has poor abrasion resistance.

INDUSTRIAL APPLICABILITY

A rubber composition comprising the diene rubber (A) of the present invention, which has a specific molecular weight distribution, and the low-molecular-weight diene rubber (B) and/or an oil extender for rubber has good processability, but can give a rubber vulcanizate having high tensile strength and good abrasion resistance.

The rubber composition of the present invention has the above-mentioned beneficial properties, and therefore, can be applied to, for example, tire parts of automobile tires such as tread, carcass, sidewall and bead, and vibration insulation materials. Especially the rubber composition is suitable for tire tread of high-performance tire. Further, it is suitable for materials for four-seasons tire, low-fuel-consumption tire and studless tire.

What is claimed is:

1. A diene rubber (A) comprised of a homopolymer or copolymer of a conjugated diene monomer, which has a weight average molecular weight (Mw) in the range of 100,000 to 3,000,000, a ratio (Mw/Mn) of weight average molecular weight (Mw) to number average molecular weight (Mn) in the range of 1.30 to 2.50, and a ratio (Mw/Mp) of weight average molecular weight (Mw) to peak top molecular weight (Mp) in the range of 0.70 to 1.30, wherein the molecular weights are measured by gel permeation chromatography and expressed in terms of that of polystyrene.

2. The diene rubber (A) according to claim 1, which is comprised of a homopolymer comprising units of a conjugated diene monomer selected from 1,3-butadiene and 2-methyl-1,3-butadiene, or a copolymer comprising at least 40% by weight of units of at least one kind of conjugated diene monomer selected from 1,3-butadiene and 2-methyl-1,3-butadiene, and not more than 60% by weight of units of an aromatic vinyl monomer.

3. The diene rubber (A) according to claim 1, which is comprised of a copolymer comprising 50% to 95% by weight of 1,3-butadiene units and 5% to 50% by weight of styrene units.

4. The diene rubber (A) according to claim 1, wherein the weight average molecular weight (Mw) as measured by gel permeation chromatography and as expressed in terms of that of polystyrene is in the range of 300,000 to 2,000,000.

5. The diene rubber (A) according to claim 1, wherein the ratio (Mw/Mn) of weight average molecular weight (Mw) to number average molecular weight (Mn) is in the range of 1.45 to 2.40.

6. The diene rubber (A) according to claim 1, wherein the ratio (Mw/Mp) of weight average molecular weight (Mw) to peak top molecular weight (Mp) is in the range of 0.75 to 1.20.

7. The diene rubber (A) according to claim 1, which is a terminal-modified diene rubber having a polar group at a terminal of polymer chain wherein the percentage of modification as defined by the ratio of modified polymer chain terminals to active terminals present as of the initiation of polymerization is in the range of 10% to 100% by mole.

8. The diene rubber (A) according to claim 1, which is a coupled diene rubber obtained by reacting an active polymer having a polymer chain terminal to which an active organometal has been bonded, with a coupling agent, wherein the percentage of coupling as defined on the basis of the polymer chain terminals having an active organometal bonded thereto is in the range of 10% to 100%.

9. A process for producing the diene rubber (A) as claimed in claim 1, characterized in that:
a conjugated diene monomer alone or at least two kinds of conjugated diene monomers, or a conjugated diene monomer or monomers together with other copolymerizable monomer or monomers, are subjected to a living polymerization in a hydrocarbon solvent;
a polymerization stopper is added to a polymerization mixture at a polymerization conversion in the range of 5% to 98% to deactivate 10% to 90% by mole of active terminals present as of the initiation of polymerization; and then,
a polymerization stopper is further added after the polymerization conversion substantially reaches 100%, to completely terminate the polymerization reaction.

10. The process for producing the diene rubber (A) according to claim 9, wherein the living polymerization is carried out using as a polymerization initiator an organolithium compound in an amount of 0.1 to 30 milli-mole per 100 g of the monomers, and in the presence of a polar compound selected from ether compounds, tertiary amines, alkali metal alkoxides and phosphine compounds in an amount of 0.01 to 100 moles per mole of the organolithium compound.

11. The process for producing the diene rubber (A) according to claim 9, wherein a polymerization stopper is added at a polymerization conversion in the range of 10% to 95% to deactivate 13% to 70% by mole of active terminals present as of the initiation of polymerization.

12. The process for producing the diene rubber (A) according to claim 9, wherein a polymerization stopper is continuously added at a polymerization conversion in the range of 5% to 98%.

13. The process for producing the diene rubber (A) according to claim 9, wherein the polymerization stopper used is selected from water, alcohols, allenes, acetylenes and compounds having a functional group containing at least one atom selected from a tin atom, a nitrogen atom, an oxygen atom and a sulfur atom.

14. A rubber composition comprising the diene rubber (A) as claimed in claim 1, and 10 to 200 parts by weight, based on 100 parts by weight of the diene rubber (A), of a reinforcing agent.

15. The rubber composition according to claim 14, wherein the reinforcing agent is at least one kind of material selected from silica and carbon block.

16. A rubber composition comprising:
the diene rubber (A) as claimed in claim 1, and
at least one kind of material selected from (1) a diene rubber (B) comprised of a homopolymer or copolymer of a conjugated diene monomer, which has a weight average molecular weight (Mw) in the range of 2,000 to 90,000 as expressed in terms of that of polystyrene, and (ii) an oil extender for rubber;
wherein the amount of the material selected from the diene rubber (B) and the oil extender is in the range of 5 to 200 parts by weight based on 100 parts by weight of the diene rubber (A) provided that, in the case when the rubber composition comprises both of the diene rubber (B) and the oil extender, the amount of each of the diene rubber (B) and the oil extender is at least 5 parts by weight and the sum of the diene rubber (B) and the oil extender is not larger than 200 parts by weight.

17. The rubber composition according to claim 16, wherein the diene rubber (B) has a weight average molecular weight (Mw) in the range of 5,000 to 70,000 as expressed in terms of that of polystyrene.

18. The rubber composition according to claim 16, wherein the ratio (Y/X) of 1,4-bond content (Y) in the diene rubber (B) to 1,4-bond content (X) in the diene rubber (A) is in the range of 0.2 to 1.4.

19. The rubber composition according to claim 16, which further comprises not larger than 500 parts by weight, based on 100 parts by weight of the diene rubber (A), of the diene units-containing rubber (C) other than the diene rubber (A) and the diene rubber (B).

20. The rubber composition according to claim 16, which further comprises a reinforcing agent in an amount of 10 to 200 parts by weight based on 100 parts by weight of the total of the diene rubbers (A) and (B) and, if any, the diene units-containing rubber (C).

21. The rubber composition according to claim 20, wherein the reinforcing agent is at least one kind of material selected from silica and carbon black.

22. A process for producing the rubber composition as claimed in claim 16, characterized as comprising the steps of:
mixing a rubber solution as obtained by termination of polymerization reaction, which contains the diene rubber (A), with stirring in a solution form together with at least one kind of material selected from (1) a rubber solution as obtained by termination of polymerization reaction, which contains a diene rubber (B) comprised of a homopolymer or copolymer of a conjugated diene monomer, which has a weight average molecular weight (Mw) in the range of 2,000 to 90,000 as expressed in terms of that of polystyrene, and (ii) an oil extender for rubber; and then,
subjecting the thus-obtained mixed solution to steam stripping to remove the solvent.

23. A rubber vulcanizate obtained by crosslinking a vulcanizable rubber composition comprising the rubber composition as claimed in claim 14, and a crosslinking agent.

* * * * *